H. L. DE ZENG.
LENS TESTING INSTRUMENT.
APPLICATION FILED FEB. 23, 1912.
1,047,000.
Patented Dec. 10, 1912
2 SHEETS—SHEET 1.
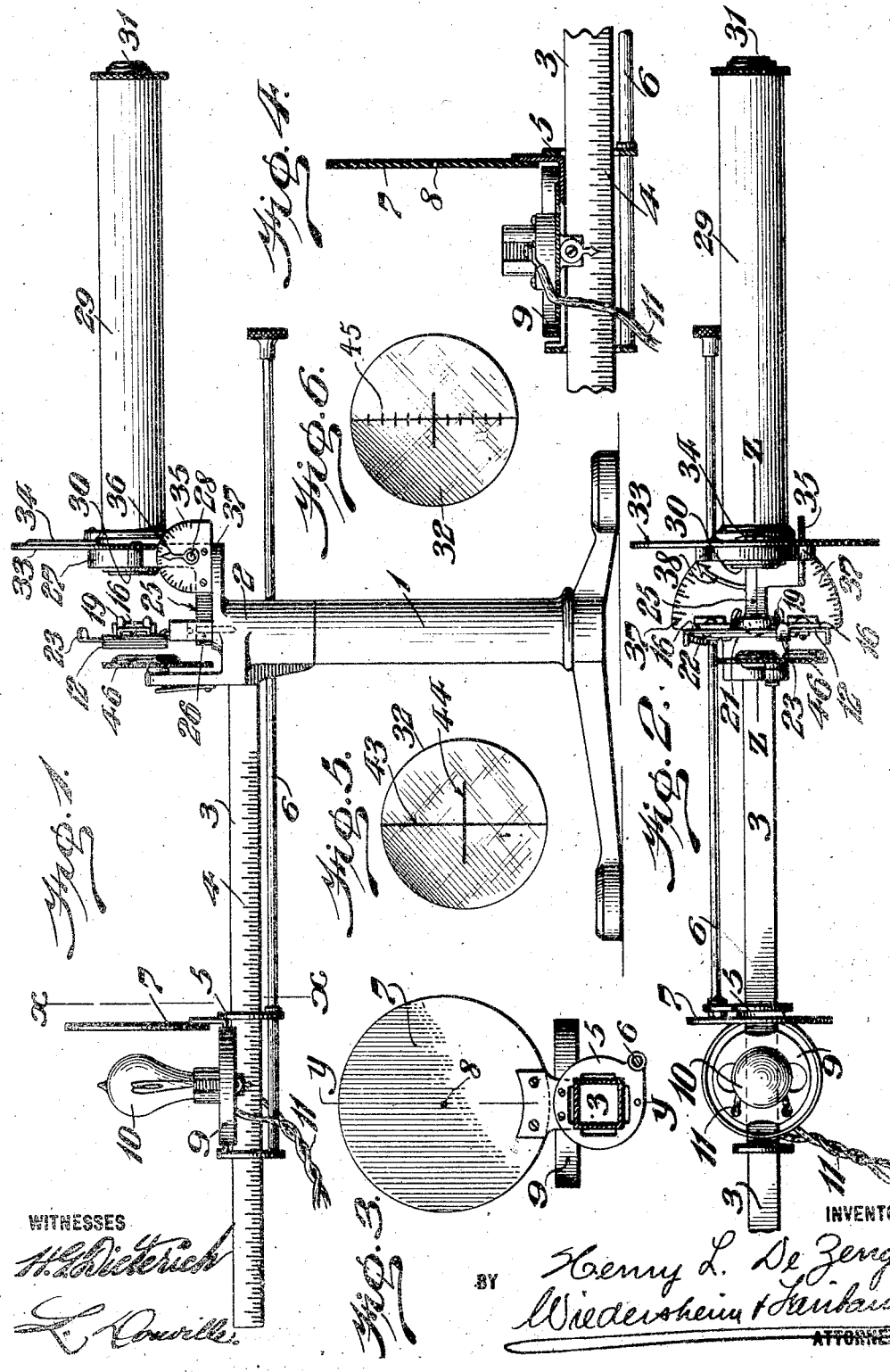
WITNESSES
INVENTOR
Henry L. De Zeng.
BY
Wiedersheim + Fairbanks
ATTORNEYS

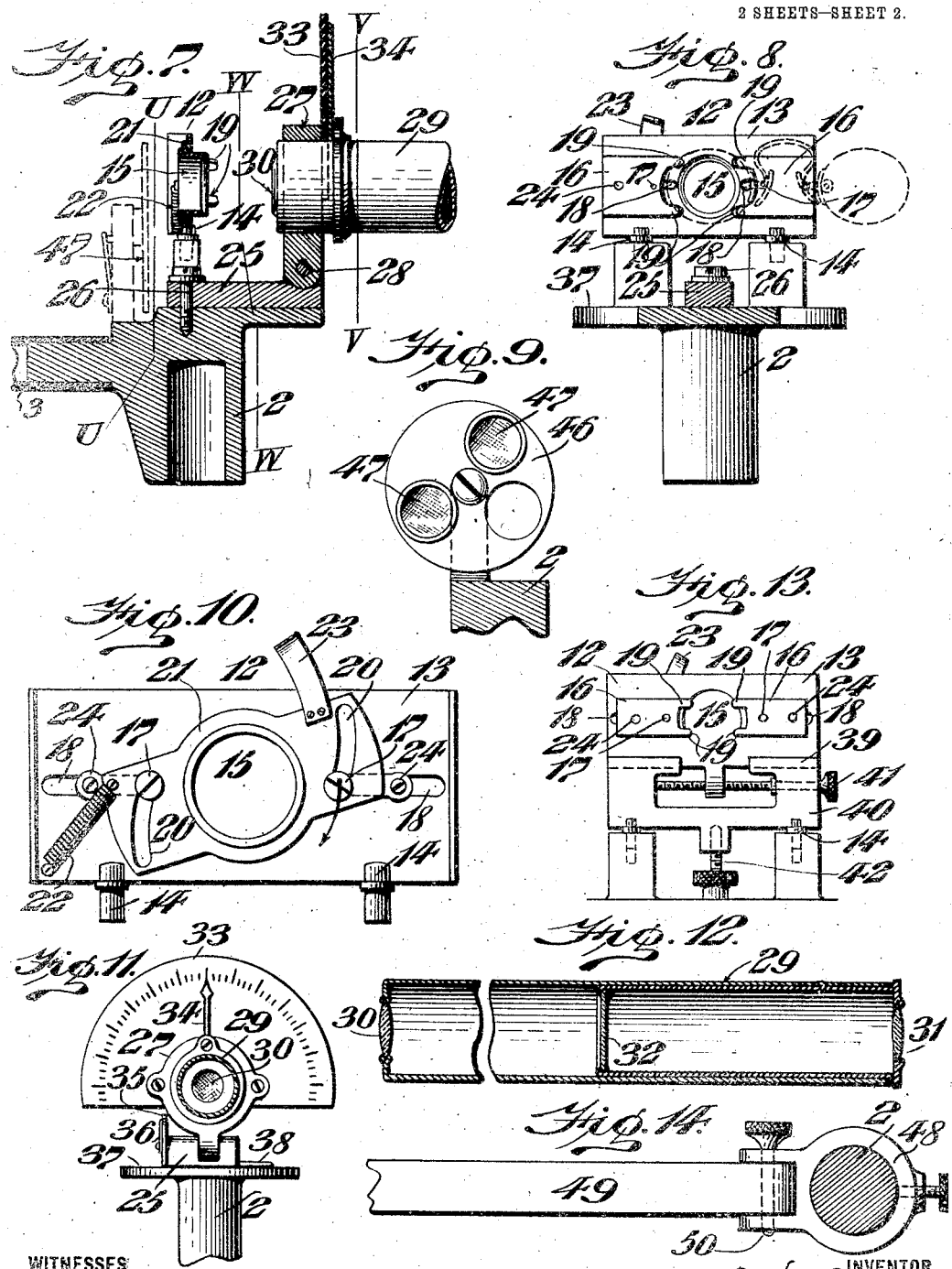

UNITED STATES PATENT OFFICE.

HENRY L. DE ZENG, OF MAPLE SHADE, NEW JERSEY.

LENS-TESTING INSTRUMENT.

1,047,000.  Specification of Letters Patent.  Patented Dec. 10, 1912.

Application filed February 23, 1912. Serial No. 679,474.

*To all whom it may concern:*

Be it known that I, HENRY L. DE ZENG, a citizen of the United States, residing at Maple Shade, in the county of Burlington, State of New Jersey, have invented a new and useful Lens-Testing Instrument, of which the following is a specification.

My invention relates to a lens testing instrument adapted to positively and accurately determine the focus, cylindrical axis and prismatic elements of a lens, and consists of a lens holder, focusing screen and test object by means of varying the relative relation of the parts.

It further consists of means for measuring the variation of the relative positions of said parts.

It further consists of a novel lens holder.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a lens testing instrument embodying my invention. Fig. 2 represents a plan view thereof. Fig. 3 represents a sectional view on line $x$—$x$ Fig. 1. Fig. 4 represents a sectional view on line $y$—$y$ Fig. 3. Figs. 5 and 6 represent elevations on an enlarged scale showing the notations which may be employed upon the screen. Fig. 7 represents a sectional view on line $z$—$z$ Fig. 2. Fig. 8 represents a sectional view on line $w$—$w$ Fig. 7. Fig. 9 represents a sectional view on line $u$—$u$ Fig. 7. Fig. 10 represents a rear elevation on an enlarged scale of the lens holder. Fig. 11 represents a sectional view on lines $v$—$v$ Fig. 7. Fig. 12 represents a sectional view of the telescope. Fig. 13 represents an elevation of a form of lens support which may be employed. Fig. 14 represents a partial, sectional view partial plan of a portion of a device showing means for varying the position of the test object.

Similar numerals of reference indicate corresponding parts in the figures.

Referring to the drawings:—1 designates a suitable standard carrying the frame 2. Suitably connected with the carrier is a bar 3 having suitable graduations or scales 4 thereon and movably mounted on said bar 3 is a carrier frame 5. Suitably connected with said carrier frame 5 is a rod 6, which is movably mounted in the frame 2 in order that the said carrier frame 5 can be adjusted in its position on the bar 3 and with respect to the lens holder. Suitably supported by the carrier frame 5 is a plate 7 having, in the present instance, an opening 8 therein, serving as the test object, said carrier frame 5 being also provided with a suitable support 9 for a source of light, as a lamp 10, which latter is adapted to be connected by means of the conductors 11 with a source of electric supply. While I have shown an electric lamp 10, it will be understood that any suitable supply of light may be employed. Suitably supported by the frame 2 is the support 12 for the lens to be tested, said support being of any suitable and desired construction, and being provided with means for holding the lens in position thereon.

In the present instance, the lens support consists of a frame 13 having the pins or projections 14 thereon, which are adapted to enter suitable recesses or openings in the frame 2 in order to hold the said frame 13 in proper position, said frame 13 being provided with a suitable opening 15 at which, the lens, to be tested, is held.

In the present instance, I have shown upon one side of the frame 13 two movable plates 16, which are located upon opposite sides of the opening 15 in said frame and which plates are movably held in position and guided in their movement by suitable means, such as screws 17, which pass through and are movable in slots 18 formed in said frame 13, the said plates 16 being provided with engaging ears 19, which project suitably for grasping the edge of the lens to be tested to hold the same in proper position with respect to the opening 15 of the frame 13. The securing screws 17 extend through to the opposite side of the frame 13 upon which the plates 16 are located and are movable in cam slots 20 in a rotatable lever or member 21, which is rotatably mounted on the frame 13 and has one end of a spring 22 connected therewith, which is also connected with the frame 13 in order that said spring 22 will normally hold the lever 21 in proper position and return the same thereto. The lever 21 is provided with a finger-piece 23 for operating the same. The lever 21 is normally held by means of the spring 22 in the position seen in Fig. 10, at which time the engaging ears 19 of the plates 16 are situated at a point adjacent the opening 15. By depressing the finger-piece 23, the lever 21 is rotated in the direction indicated by the arrow in said figure, which causes the screws 17 to be moved outwardly by means of the cam slots 20, carrying with them the plates 16 and engaging ears 19, which latter are thus moved away from the opening 15 to permit of the insertion of the lens between the ears, after which by releasing the finger-piece 23, the spring 22 retracts the plates 16 and ears 19, causing the latter to firmly engage with the edge of the lens to be tested, and hold the same in position. If desired, I may provide the screws or headed pins 24 on the plates 16, which pins are movable in the slots 18 in the frame 13 to assist in guiding the plates 16 in their movement.

25 designates an arm pivotally mounted on the frame 2 at a point which substantially coincides with the vertical axis of the lens when the same is in position on the lens holder, and, in the present instance, at the point 26, said arm 25 being adapted for lateral movement.

27 designates a collar which is pivotally mounted as at 28 upon the arm 25 so that the said collar may have a radial movement with respect to the said arm 25. Suitably secured to the collar 27 is a telescope 29, which is preferably provided at its opposite ends with the lenses 30 and 31 and at a suitable point therein with the screen 32, it being understood that the telescope 29 is rotatably mounted in the collar 27, and that I provide a vernier or scale, and a hand or pointer common to said collar 27 and telescope 29 in order that the degree or amount of rotation of the screen may be measured.

As herein shown, I have mounted the scale 33 upon the collar and I have provided a hand or pointer 34 upon the telescope 29 in order that when the latter is rotated, the hand is carried therewith so that the amount or degree of rotation of the screen may be measured. As the collar 27 and telescope 29 are pivotally mounted on the arm 25, and as the collar can be moved radially in order to vary the angular position of the telescope 29 and so the screen 32 with respect to the test object 8 and lens to be tested I desire to measure the amount of variation, and I have provided a scale and pointer for this purpose.

As here shown, I have mounted the scale 35 upon the arm 25, and I have mounted the hand or pointer 36 rigidly with respect to the collar 27 so that as the latter is turned the hand or pointer 36 is carried therewith and will indicate the amount of the radial movement and the vertical displacement of the object on the screen. As the arm 25 is pivotally mounted upon the frame 2 and can be moved laterally in order to vary the angular position of the telescope 29 and so the screen 32 with respect to the test object 8 and the lens to be tested, I have provided a vernier or scale in order to measure this movement, and as here shown, the scale 37 is mounted upon the frame 2, and the hand or pointer 38 is connected with the arm 25 in order that as the said arm 25 is swung laterally, the pointer will indicate the degree or amount thereof, so that the lateral displacement of the image upon the screen may be measured.

By the construction just described, it will be apparent that I have provided means for varying the relative, angular position of the lens, screen and test object, whereby the decentration of the object upon the screen may be measured since I am enabled to vary the relative, angular position of the various parts, as will be evident.

While I have shown and described the means for varying the relative angular position of the parts by means of the movement of the screen, any suitable movement of any of the parts may be employed, as, for example, as shown in Fig. 13, I may move the lens support vertically and laterally to accomplish the desired results. This may be accomplished by mounting the frame 13 in suitable guides 39 on a base 40 and by means of a set screw 41, mounted in the base 40 and engaging with a suitable portion of the frame 13, I may impart a lateral movement to the said frame 13. By means of a screw 42 engaging with a suitable part of the base 40 and also with the stationary portion of the frame 2, I may impart a vertical movement to the base 40 and frame 13, as will be evident.

As above stated, I have now described the construction and operation whereby I am enabled to determine the decentration of the lens, that is to say, the prismatic elements thereof and by the movement on the bar 3 of the test object 8 to and from the lens holder, I am enabled to determine the focus of the lens.

In order to determine the cylindrical axis of the lens, I provide upon the eye-piece or screen 32, the cross-hairs 43 and 44 which locate the center, and by rotating the screen 32, I am enabled definitely and accurately to measure, in conjunction with the scale 33 and indicator 34, the angular position of the object, as will be evident.

In the construction shown in Fig. 6, I have shown means for measuring the prismatic elements in a lens by means of a series of graduated lines 45 placed upon the screen 32 at definite intervals in order that any decentration of the object may be measured thereby.

In order to measure lenses of negative character, I have provided a disk 46 rotatably mounted at a suitable point upon the carrier frame 2 with respect to the lens to be tested, in order that the supplementary lenses 47 carried by said disk 46 can be rotated into or out of position with respect to the lens to be tested.

In Fig. 14, I have shown a portion of the device in order to illustrate means whereby the bar supporting the test object may be moved in order to vary the relative angular position of the parts, and in this construction, I have shown a collar 48 rotatably mounted upon a suitable portion of the frame 2 and I have pivotally mounted a bar 49 at a suitable point, as at 50, on said collar, by which means it will be seen that I can provide for lateral movement of the bar by rotation of the collar on the frame 2, and I can provide for the radial movement or vertical adjustment of the bar by means of its pivotal connection with said collar, it being understood that in this way the angular position of the test object may be varied.

It will be further understood that suitable means for measuring the lateral movement of the bar and the radial movement thereof may be provided. This bar 49 may be provided with suitable graduations or scales similar to the graduations or scales 4 on the bar 3 in order that the position of the carrier and the test object may be measured, and in each instance, I provide a suitable pointer or hand upon the carrier, as will be evident.

It will now be apparent that I have devised a novel and useful construction of a lens testing instrument, which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, a support for the lens to be tested, a screen, a test object, and means for varying the relative angular position of said lens, screen and test object whereby the decentration of the object upon the screen may be measured.

2. In a device of the character stated, a support for the lens to be tested, a screen, a test object, and means for varying the relative angular position of said screen and test object whereby the decentration of the object upon the screen may be measured.

3. In a device of the character stated, a support for the lens to be tested, a screen, a test object, means for varying the relative angular position of said screen and test object, and means for measuring the different positions thereof whereby the amount of decentration of the object upon the screen may be determined.

4. In a device of the character stated, a support for the lens to be tested, a screen, a test object, and means for varying the relative angular position of the screen and the lens to be tested whereby the decentration of the object upon the screen may be measured.

5. In a device of the character stated, a support for the lens to be tested, a screen, a test object, means for varying the relative angular position of the screen and the lens to be tested, and means for measuring the varying positions whereby the decentration of the object upon the screen may be determined.

6. In a device of the character stated, a support for the lens to be tested, a screen, a test object, and means for varying the relative angular position thereof whereby the lateral or vertical displacement of the image upon said screen may be measured.

7. In a device of the character stated, a support for the lens to be tested, a screen, a light source, and means located between said screen and light source whereby the lateral or vertical displacement of the image upon said screen may be measured.

8. In a device of the character stated, a support for the lens to be tested, a screen, a test object, means for varying the relative angular position of said screen and test object, means for measuring the lateral displacement of the image upon said screen, means for measuring the vertical displacement of the image upon said screen, and means for measuring the cylindrical axis of the lens.

9. In a device of the character stated, a support for the lens to be tested, a test object, means for adjusting the position of said test object with respect to said lens, a screen, and means for raising and lowering said screen with respect to said lens.

10. In a device of the character stated, a support for the lens to be tested, a test object, means for varying the position of said test object with respect to said lens, a screen, means for raising and lowering said screen, and means for measuring the degree of variation of said screen.

11. In a device of the character stated, a support for the lens to be tested, a test object, means for adjusting the position of said test object with respect to said lens, a screen, and means for moving said screen laterally with respect to said lens.

12. In a device of the character stated, a support for the lens to be tested, a test object, means for adjusting the position of said test object with respect to said lens, a screen, means for moving said screen laterally with respect to said lens, and means for measuring the amount of lateral movement of said screen.

13. In a device of the character stated, a support for the lens to be tested, a test object, means for varying the position of said test object with respect to said lens, a screen, means for varying the vertical position of said screen with respect to said lens, means for varying the lateral position of said screen with respect to said lens, and means for measuring the vertical and lateral variation of said screen.

14. In a device of the character stated, a support for the lens to be tested, means for holding the said lens in position thereon, a test object, a screen, and means for pivotally supporting said screen at a point substantially in line with the axis of the lens to be tested.

15. In a device of the character stated, a support for the lens to be tested, a test object, means for varying the position of the test object with respect to the lens, an arm pivotally mounted for lateral movement with respect to said lens, a collar mounted for radial movement with respect to said arm, and a screen suitably carried by said collar.

16. In a lens support, a frame, plates slidingly mounted thereon and having gripping ears, a lever rotatably mounted on said frame and having cam slots, pins engaging said cam slots and carried by said plates whereby the latter are caused to slide on said frame, and means for holding the said lever in normal position and returning the same thereto.

17. In a lens support, a frame, plates movably mounted thereon and having gripping ears, a lever rotatably mounted on said frame and having cam slots, pins carried by said plates and engaging in said cam slots, and a spring for holding said lever and plates in normal position and for returning the same thereto.

18. In a device of the character stated, a test object, a screen, a lens support, and means for adjusting the relative position of said object, screen or support in suitable relation with respect to said screen for determining the prismatic elements of a lens.

19. In a device of the character stated, a test object, a screen, a lens support, and means for adjusting the relative position of said object, screen or support for determining the cylindrical axis and prismatic elements of a lens.

20. In a device of the character stated, a test object, a screen, a lens support, and means for adjusting the relative position of said object, screen or support for determining the focus, cylindrical axis and prismatic elements of a lens.

21. In a device of the character stated, a test object, a lens support, and means for adjusting the relative position of said object, screen or support for measuring the focus and the decentration of a lens.

HENRY L. DE ZENG.

Witnesses:
C. D. McVay,
M. E. Byrne.